(12) United States Patent
Bitar et al.

(10) Patent No.: US 8,121,783 B2
(45) Date of Patent: Feb. 21, 2012

(54) METHOD FOR SELECTIVE FILTERING OF AN AIRCRAFT FLIGHT PLAN ACCORDING TO THE OPERATIONAL NEEDS

(75) Inventors: Elias Bitar, Tournefeuille (FR); Stéphane Leriche, Colomiers (FR); Christophe Caillaud, Blagnac (FR)

(73) Assignee: Thales (FR)

( * ) Notice: Subject to any disclaimer, the term of this patent is extended or adjusted under 35 U.S.C. 154(b) by 1047 days.

(21) Appl. No.: 11/952,440

(22) Filed: Dec. 7, 2007

(65) Prior Publication Data

US 2008/0154491 A1 Jun. 26, 2008

(30) Foreign Application Priority Data

Dec. 8, 2006 (FR) ...................................... 06 10728

(51) Int. Cl.
*G01C 21/00* (2006.01)
(52) U.S. Cl. ........ 701/206; 701/120; 701/205; 340/963; 244/181
(58) Field of Classification Search ................ 701/4, 11, 701/14, 120, 205, 206; 340/963, 977–979, 340/973; 244/75.1, 181
See application file for complete search history.

(56) References Cited

U.S. PATENT DOCUMENTS

| 6,163,744 | A | 12/2000 | Onken et al. | |
|---|---|---|---|---|
| 6,389,355 | B1 | 5/2002 | Gibbs et al. | |
| 6,870,490 | B2 * | 3/2005 | Sherry et al. | 340/970 |
| 7,433,781 | B2 | 10/2008 | Bitar et al. | |
| 7,493,197 | B2 | 2/2009 | Bitar et al. | |
| 2006/0059497 | A1 | 3/2006 | Leriche et al. | |
| 2006/0142904 | A1 | 6/2006 | Caillaud et al. | |
| 2006/0235581 | A1 * | 10/2006 | Petillon | 701/3 |
| 2007/0031007 | A1 | 2/2007 | Bitar | |
| 2007/0050098 | A1 | 3/2007 | Caillaud | |
| 2007/0053609 | A1 | 3/2007 | Bitar et al. | |
| 2007/0088492 | A1 | 4/2007 | Bitar et al. | |
| 2007/0150117 | A1 | 6/2007 | Bitar et al. | |

(Continued)

FOREIGN PATENT DOCUMENTS

WO  0229363 A2  4/2002

OTHER PUBLICATIONS

RTCA DO 236B, "Minimum Aviation System Performance Standards: Required Navigation Performance for Area Navigation", Oct. 28, 2008, RTCA—Radio Technical Commission fo Aeronautics.

*Primary Examiner* — Gertrude Arthur Jeanglaude
(74) *Attorney, Agent, or Firm* — Lowe Hauptman Ham & Berner, LLP

(57) ABSTRACT

The present invention relates to a method for selective filtering of a flight plan according to the operational needs, and it is characterized in that elements specific to the structure of the flight plan are added by the flight management system according to the nature of the elements inserted by the operator onto the flight plan, in order to determine whether these elements should or should not be taken into account for their use in the computations relating to the flight plan. This operator may, on his MMI (man-machine interface) carry out visual filterings of certain characteristic points or portions of the flight plan. This method makes it possible to add elements to a flight plan without modifying its essence and above all the maneuvers that are associated therewith.

20 Claims, 4 Drawing Sheets

U.S. PATENT DOCUMENTS

| | | |
|---|---|---|
| 2007/0150121 A1 | 6/2007 | Bitar et al. |
| 2007/0174005 A1 | 7/2007 | Bitar et al. |
| 2007/0187554 A1 | 8/2007 | Bitar et al. |
| 2007/0219705 A1 | 9/2007 | Bitar et al. |
| 2007/0225876 A1 | 9/2007 | Caillaud et al. |
| 2007/0233331 A1 | 10/2007 | Caillaud |
| 2007/0276553 A1 | 11/2007 | Bitar et al. |
| 2007/0285283 A1 | 12/2007 | Bitar et al. |
| 2008/0046171 A1 | 2/2008 | Bitar et al. |
| 2008/0059058 A1 | 3/2008 | Caillaud et al. |
| 2008/0086243 A1 | 4/2008 | Caillaud et al. |
| 2008/0174454 A1 | 7/2008 | Bitar et al. |
| 2009/0055035 A1 | 2/2009 | Caillaud |

\* cited by examiner

METHOD FOR SELECTIVE FILTERING OF AN AIRCRAFT FLIGHT PLAN ACCORDING TO THE OPERATIONAL NEEDS

RELATED APPLICATIONS

The present application is based on, and claims priority from, French Application Number 06 10728, filed Dec. 8, 2006, the disclosure of which is hereby incorporated by reference herein in its entirety.

BACKGROUND OF THE INVENTION

The present invention relates to a method for selective filtering of an aircraft flight plan according to the operational needs.

DESCRIPTION OF RELATED ART

Many elements of an aircraft flight plan are merely information relating to the progress of the aircraft along its flight plan and not the reference used to construct its set point trajectory. These points may be projections of a point which may or may not belong to the flight plan, positioned at a precise distance from a reference point, for example at the intersection of a geographic parallel. These transfer points are computed based on the "ground" reference associated with the manoeuvre containing the transfer point and are not intended to be recomputed. These points typically correspond to requests emanating from air traffic control relating to the progress of the aircraft.

The current systems, contrary to what is recommended in the standard documentation RTCA DO 236B ("DO236B Minimum Aviation System Performance Standards: Required Navigation Performance for Area Navigation" published on 28 Oct. 2003 by the RTCA—Radio Technical Commission for Aeronautics) change the very structure of the flight plan, which leads to changing certain expected aircraft manoeuvres in the following manner, schematized in FIG. 1.

This FIG. 1 shows the initial "waypoints" of flight plan "R336W" and "ABAGN" and the "offsetted" point "LACOU". The addition of a transfer point "PD01" between the points "R336W" and "LACOU" results in dividing the "leg" (trajectory segment, that is to say the smallest unit of the flight plan, and that will be designated below by this term usually employed in aeronautics) to "LACOU" into a leg to "PD01" and a new leg between "PD01" and "LACOU". If a point computed as a distance relative to "LACOU" is inserted too close to the latter, the computed trajectory will be the trajectory represented by a dashed line on the drawing. Where the operator expects the display of an item of distance information relative to a point, he obtains a modified trajectory that no longer complies with the initial trajectory.

SUMMARY OF THE INVENTION

The subject of the present invention is a method for selective filtering of a flight plan according to the operational needs, a method that makes it possible to add elements to a flight plan without modifying its essence and above all the manoeuvres that are associated therewith.

The method according to the invention is characterized in that elements specific to the structure of the flight plan are added by the flight management system according to the nature of the elements inserted by the aircraft operator onto the flight plan, in order to determine whether these elements should or should not be taken into account for their use in the computations relating to the flight plan. The APF (Along Path Fix) type of element is typically added when the operator inserts an element into the flight plan and this element is not intended to modify the lateral trajectory of the aircraft.

Advantageously, at least one of the following elements is the said specific element:
   ATO (Along Track Offset): a point positioned in distance relative to a point of the flight plan along the trajectory,
   orthogonal projection of a point on the trajectory,
   intersection of a ray with the trajectory,
   intersection of a circle with the trajectory,
   crossing of latitude or longitude by the trajectory.

According to another feature of the invention, the operator determines whether the said elements are used in the computation of the trajectory of the aircraft.

According to another feature of the invention, the flight of the aircraft is slaved to the computed trajectory taking account of the said elements.

According to another feature of the invention, the said elements are filtered by the operator with the aid of a man-machine interface.

According to another feature of the invention, the method of the invention is applied to a flight plan tree structure.

Still other objects and advantages of the present invention will become readily apparent to those skilled in the art from the following detailed description, wherein the preferred embodiments of the invention are shown and described, simply by way of illustration of the best mode contemplated of carrying out the invention. As will be realized, the invention is capable of other and different embodiments, and its several details are capable of modifications in various obvious respects, all without departing from the invention. Accordingly, the drawings and description thereof are to be regarded as illustrative in nature, and not as restrictive.

BRIEF DESCRIPTION OF THE DRAWINGS

The present invention is illustrated by way of example, and not by limitation, in the figures of the accompanying drawings, wherein elements having the same reference numeral designations represent like elements throughout and wherein.

DETAILED DESCRIPTION OF THE INVENTION

The solution of the invention consists in adding specific elements to the flight plan without modifying the structure thereof or the resultant trajectory of the aircraft concerned, these specific elements, usually points (such as ATO) or portions characteristic of the flight plan (EOSID Engine Out Standard Instrument Departure), making it possible to determine whether such points should or should not be taken into account for their use, in particular, but not exclusively, for computing the reference trajectory and, according to the characteristics of these points, for making computed predictions of speed, altitude, flight time, fuel quantity. Therefore the invention allows the operator to carry out on the screen of his MMI (man-machine interface) visual filterings on these characteristic points or portions of the flight plan. In the following description, reference is made to a tree structure flight plan, but it is well understood that the invention may equally be applied to a conventional flight plan, without however being able to benefit from all the advantages inherent in the tree structure flight plan. Specifically, the use of a tree makes it possible to structure flight plan information in a succession of steps having an operational direction. Each element of this tree may have characteristics that identify a functionality that can be filtered subsequently.

In addition, the invention is described below with reference to computing the points of an aircraft trajectory, but it is well understood that it is not limited to this application only, and that it may be applied for other specific elements of a flight plan such as points of the gas application procedure or reference points used to compute the offset.

Figure 2:
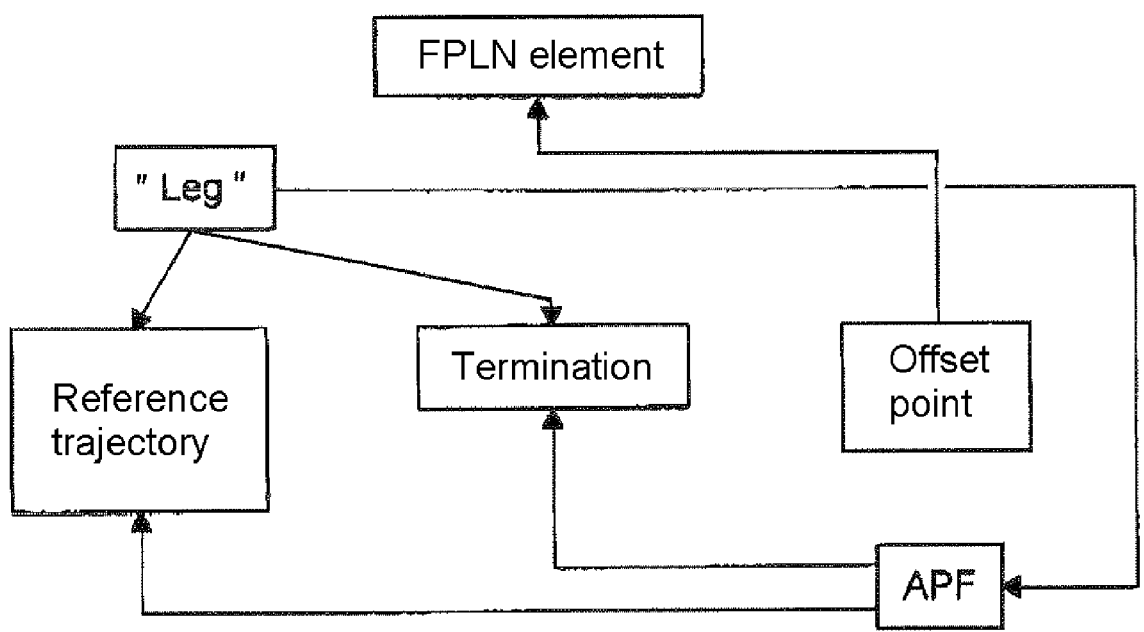
FIG. 2 is a simplified block diagram explaining how the method of the invention is applied to a tree structure flight plan.

The block diagram of FIG. 2 schematizes a part of a flight plan, and in particular an element 1 "FPLN element" of this flight plan. This element here comprises the following "sheets": a "leg" (a reference manoeuvre of the aircraft defined by a path and a termination condition), a point 3 (called "APF" or "Along Path Fix") situated along the reference trajectory 4 (a point that must know this reference and its termination 5) and a point 6 (called the "offset point") used to define a trajectory (called "offset") parallel to the reference trajectory. This means that the tree structure of the flight plan may comprise three sorts of sheets: legs (2), and reference trajectory and offset points (3 and 6).

The generation of the reference trajectory uses the said sheets according to the instantaneous needs. For the nominal computation of the lateral trajectory (no offset in progress), the sheets of the "APF" type are ignored and only the legs are used. When an "offset point" sheet exists, the computation of the trajectory ignores the initial point (this point being a leg termination). This principle of filtering according to the needs, that is used upstream of the computation of the lateral trajectory, makes it possible to render the trajectory computation algorithms completely independent of the nature of the sheets manipulated.

Figure 3:
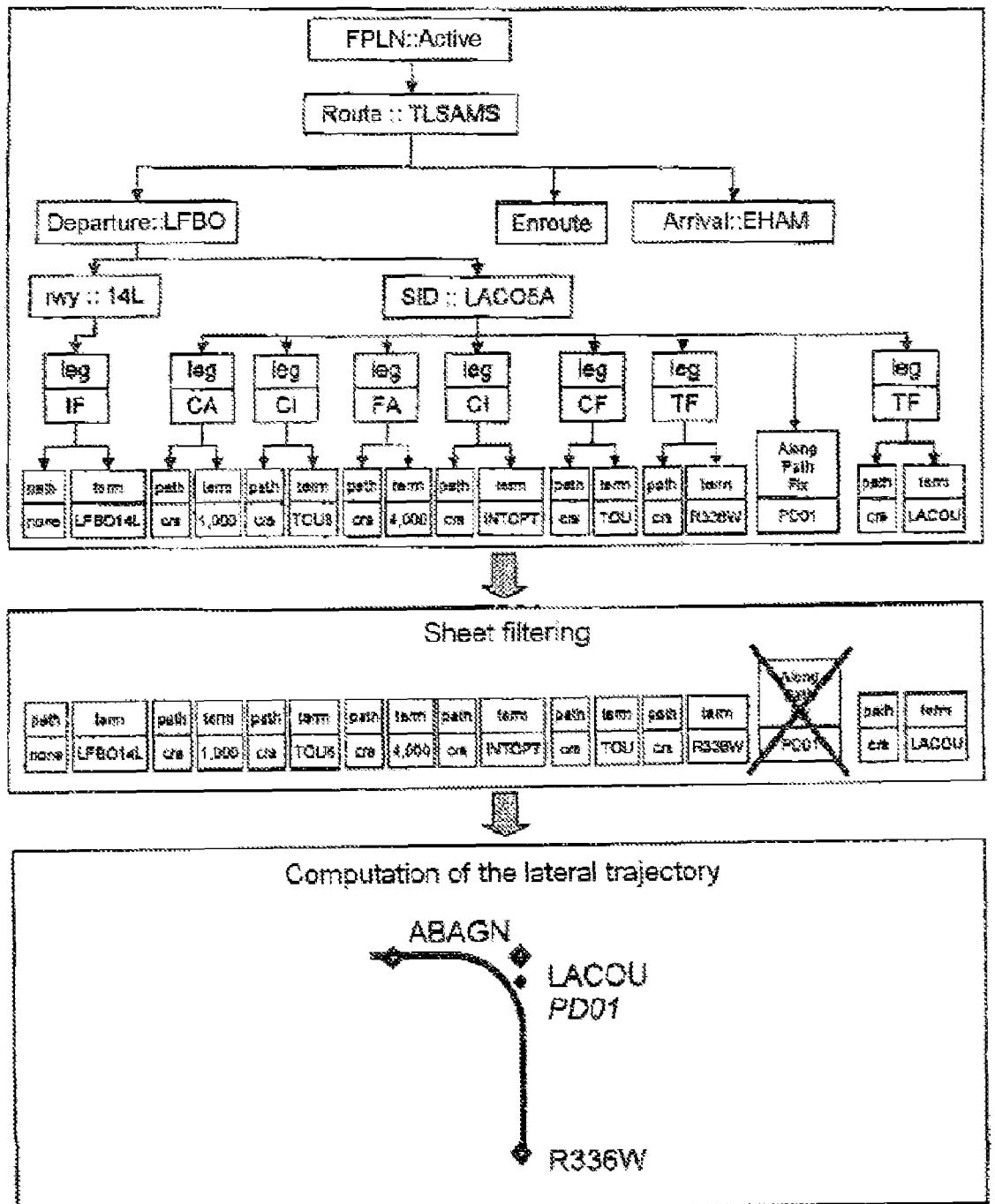
FIG. 3 is a partial diagram of a tree structure flight plan showing how the method according to the present invention is applied thereto.

The top of FIG. 3 schematizes a tree structure flight plan ("FPLN::active") relating to a liaison mission between the airports of Toulouse and Amsterdam. This is indicated by "Route::TLSAMS". A first level of the flight plan comprises the elements "Departure::LFBO" (airport of departure: Toulouse), "enroute" (cruising phase) and "Arrival::EHAM" (airport of arrival: Amsterdam).

The branch corresponding to the element "Departure::LFBO" comprises the elements "rwy::14L" (identification of the runway) and "SID::LACO5A" (identification of the "Standard Input Departure" procedure marked "SID"). On the next level of the tree structure, these two branches continue with the different "legs" that are contained in the flight plan. These legs are, in the present case, "IF" ("Initial Fix"), "CA" ("Course to Altitude"), "CF" ("Course to Fix"), "FA" ("Fix to Altitude"), "CI" ("Course to Interception") and "TF" ("Track to Fix"). These various legs are specified on the next level by the "path", "term" (leg termination) and "APF" sheets (mentioned above).

According to the invention, and as schematized in the middle of FIG. 3 (only the flight plan sheets have been used here), the user filters (neutralizes) the APF sheet corresponding to the transfer point "PD01" which must not be taken account of for computing the trajectory of the aircraft (whereas this could not be the case with the current methods, as explained above with reference to FIG. 1). The computed trajectory is then that shown on the diagram at the bottom of FIG. 3 and joining the points "R336W" and "ABAGN". The point "PD01", shown shaded, is therefore no longer used for computing the trajectory.

The main filterings that the invention makes provision to apply to the sheets are, in a non-limiting manner:

filtering of the terminations of the legs and transfer points (used to create APFs), of the "Along Track Offsets" (used to create lateral trajectories), of the "Abeams" (projections of fixed points on a flight plan), etc.

filtering of the "offsetted" points and of the offset joining points, filtering of the "enroute" elements and of the "terminal waypoints" (terminal points of the legs).

The filtering of the invention takes account of certain attributes such as the overfly set point. Specifically, if the operator of the aircraft requests an overfly of a point and whether the latter is a transfer point or not, he must imperatively enter into the generation of the trajectory. This in no way changes its nature because the deletion of its "overfly" attribute must authorize its future filtering.

Figure 4:
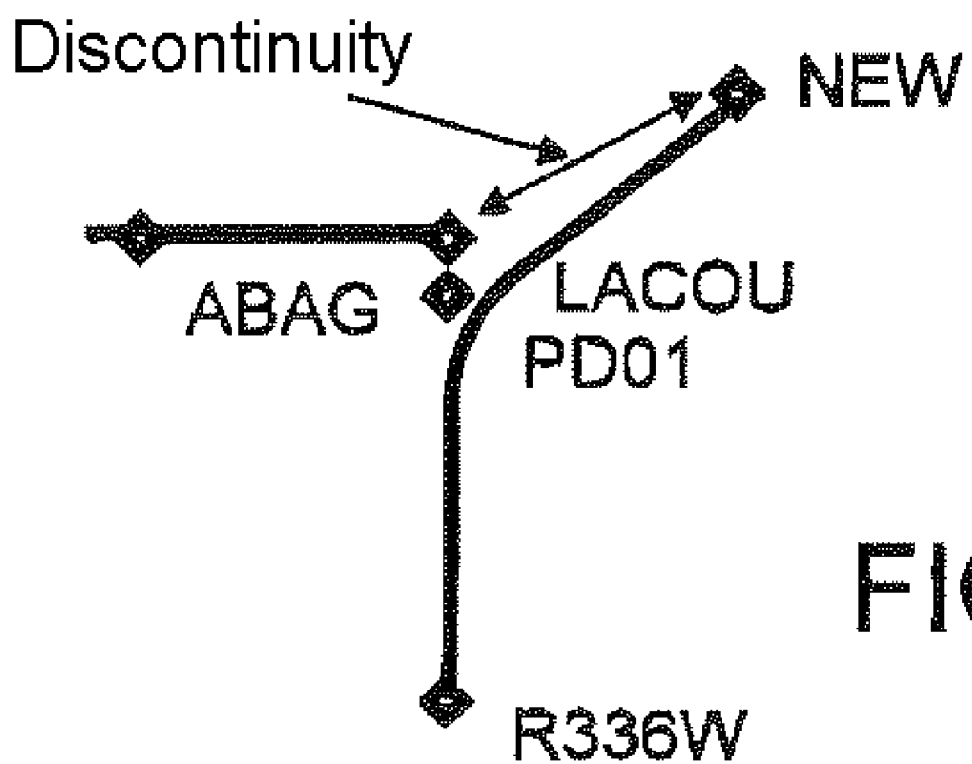
FIG. 4 is a simplified diagram of a "leg" of a flight plan showing how the method according to the present invention is applied thereto.

FIG. 4 illustrates another general feature of the invention, according to which the flight management system changes the nature of a specific element, for example of a sheet, following an intervention of the operator. Such a feature is applied for example when a transfer point becomes an anchorage of a new sequence of legs, which is illustrated in FIG. 4.

Figure 1:
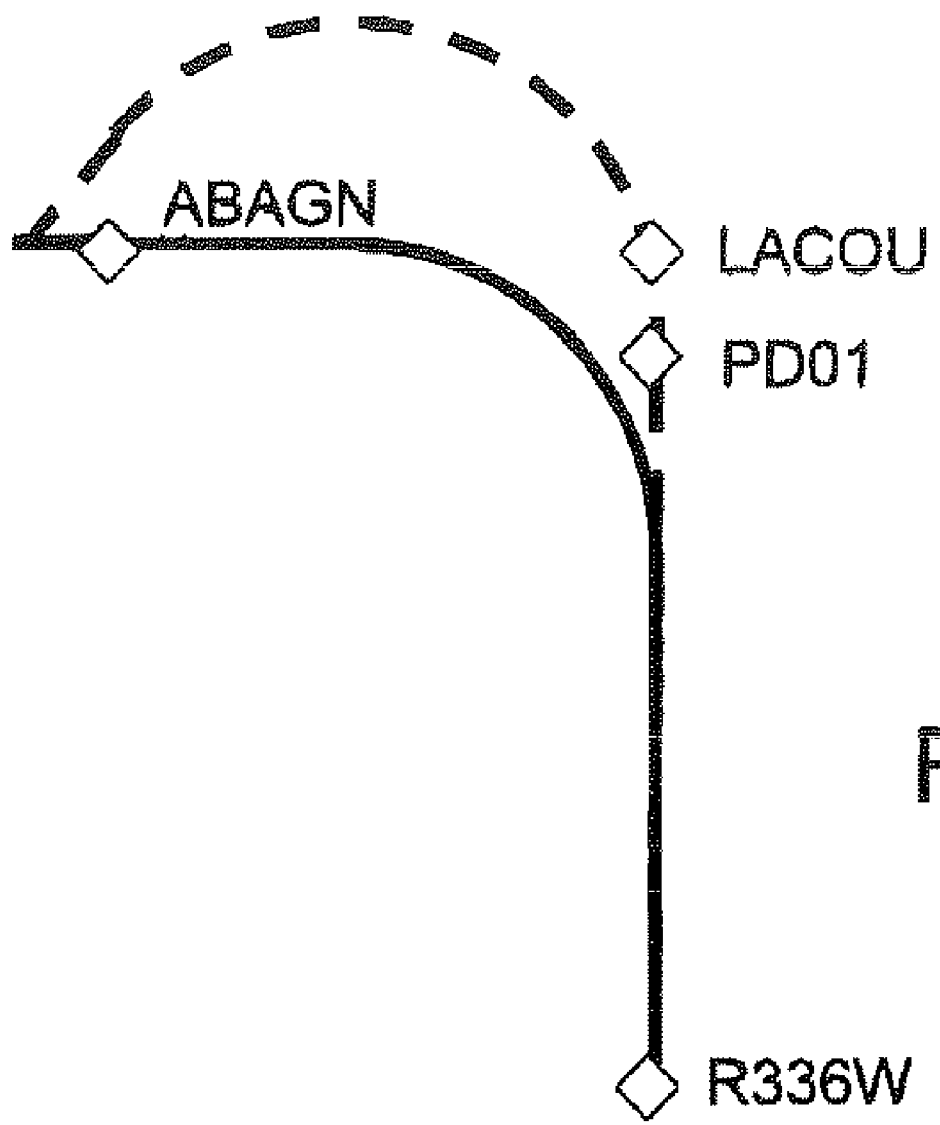
FIG. 1, already mentioned above, is a simplified diagram of a flight plan "leg" used to explain the disadvantages of the methods of the prior art.

The diagram of FIG. 4 is similar to that of FIG. 1 except that the "NEW" point has been added behind the transfer point "PD01". The flight management system converts the "APF" sheet to a "leg" sheet by taking the point PD01 as a termination. Such a conversion process is known per se for being used systematically in the systems of the prior art accepting the addition of a transfer point on the reference flight plan. According to the present invention, this process is applied only when the operator really wishes to proceed with a modification of the resultant trajectory.

According to another feature of the invention, the branches themselves are filtered. Examples of such filterings are as follows:

filtering of the "missed approach", filtering of the EOSID (Engine Out Standard Instrument Departure), filtering of the diversion flight plan, etc.

In the cases of "missed approach" and of EOSID, the computation of the lateral trajectory is limited to a display of the basic structure of the leg. The computed trajectory is therefore limited to the positioning of the leg termination point and to the basic shape of the path for purposes of displaying and computing distance.

For a diversion flight plan, the algorithms used take no account of certain constraints and do not have the same objective of precision. It is therefore acceptable to simplify the computation of the lateral trajectory and to take larger integration steps in the prediction computations. In this case, the application of the invention, although not modifying the operational result, makes it possible to reutilize the same generic algorithms of computation and access to information which the operator may need for all the identified cases of such a flight plan. Consequently, the invention enhances the robustness and reliability of the generation of the trajectory and the predictions for this diversion flight plan.

Finally, the filtering technique of the invention is advantageously applied for different needs such as:

the generation of the lateral trajectory and of the vertical trajectory, the slaving of the aircraft to the computed trajectory, the downwards transmission of the flight plan to air traffic control, the viewing of all pertinent information on the man-machine interface of the operator, etc.

It will be readily seen by one of ordinary skill in the art that the present invention fulfils all of the objects set forth above. After reading the foregoing specification, one of ordinary skill in the art will be able to affect various changes, substitutions of equivalents and various aspects of the invention as broadly disclosed herein. It is therefore intended that the protection granted hereon be limited only by the definition contained in the appended claims and equivalent thereof.

The invention claimed is:

1. A method for selective filtering of a flight plan of an aircraft according to operational needs, comprising the steps of:
    adding elements specific to a structure of the flight plan by a flight management system by an operator of the aircraft onto the flight plan; and
    filtering the added elements of the flight plan by applying at least one of the following filters: terminations of legs and transfer points, "Along Track Offsets", "Abeams", "offsetted" points and of offset joining points, "terminal waypoints", airports and overfly set points,
    wherein
    the filtered elements are ignored during computations relating to the flight plan, and
    said one of the applied filters is determined according to the operational needs of the computations relating the flight plan.

2. The method according to claim 1, wherein the aircraft operator determines whether each added element remaining in the flight plan is used in a computation of a trajectory of the aircraft.

3. The method according to claim 1, wherein the added elements are characteristic points or portions of the flight plan.

4. The method according to claim 1, wherein each added element is at least one of the following elements:
    APF ("Along Path Fix") element, ATO ("Along Track Offset"), orthogonal projection of a point on a trajectory, intersection of a ray with the trajectory, intersection of a circle with the trajectory, crossing of latitude or longitude by the trajectory.

5. The method according to claim 1, wherein a trajectory of the aircraft is slaved to a computed trajectory taking account of the elements.

6. The method according to claim 1, wherein the added elements are filtered by the operator with the aid of a man-machine interface.

7. The method according to claim 6, wherein the method is applied to a tree structure flight plan.

8. The method according to claim 7, wherein the filtering is applied to sheets of the tree structure flight plan and that the method comprises at least one of the following filterings:
    filtering of the terminations of the legs and transfer points, of the "Along Track Offsets", of the "Abeams", filtering of the "offsetted" points and of offset joining points, filtering of the "enroute" elements and of the "terminal waypoints", filtering of the airports, filtering of the overfly set point.

9. The method according to claim 8, wherein the flight management system changes the nature of each added element following an intervention of the operator.

10. The method according to claim 8, wherein the filtering is applied to branches of the tree structure flight plan and that the method comprises at least one of the following filterings:
    filtering of a "missed approach", filtering of an EOSID, filtering of a diversion flight plan.

11. The method according to claim 1, wherein the method is applied for at least one of the following needs:
    generation of a lateral trajectory and of a vertical trajectory, slaving of the aircraft to a computed trajectory, a downwards transmission of the flight plan to air traffic control, viewing of all pertinent information on a man-machine interface of the operator.

12. The method according to claim 1, wherein the method is applied to a tree structure flight plan.

13. The method according to claim 2, wherein the added elements are characteristic points or portions of the flight plan.

14. The method according to claim 2, wherein each added element is at least one of the following elements:
    APF ("Along Path Fix") element, ATO ("Along Track Offset"), orthogonal projection of a point on the trajectory, intersection of a ray with the trajectory, intersection of a circle with the trajectory, crossing of latitude or longitude by the trajectory.

15. The method according to claim 3, wherein each added element is at least one of the following elements:
    APF ("Along Path Fix") element, ATO ("Along Track Offset"), orthogonal projection of a point on trajectory, intersection of a ray with the trajectory, intersection of a circle with the trajectory, crossing of latitude or longitude by the trajectory.

16. The method according to claim 2, wherein the elements are filtered by the operator with the aid of a man-machine interface.

17. The method according to claim 3, wherein the elements are filtered by the operator with the aid of a man-machine interface.

18. The method according to claim 4, wherein the added elements are filtered by the operator with the aid of a man-machine interface.

19. The method according to claim 2, wherein the selective filtering is applied to sheets of a tree structure and that the method comprises at least one of the following filterings:
    filtering of the terminations of the legs and transfer points, of the "Along Track Offsets", of the "Abeams", filtering of the "offsetted" points and of the offset joining points, filtering of the "enroute" elements and of the "terminal waypoints", filtering of the airports, filtering of the overfly set point.

20. The method according to claim 4, wherein the filtering is applied to sheets of a tree structure and that the method comprises at least one of the following filterings:
    filtering of the terminations of the legs and transfer points, of the "Along Track Offsets", of the "Abeams", filtering of the "offsetted" points and of the offset joining points, filtering of the "enroute" elements and of the "terminal waypoints", filtering of the airports, filtering of the overfly set point.

* * * * *